United States Patent
Constable et al.

(10) Patent No.: US 8,976,189 B2
(45) Date of Patent: Mar. 10, 2015

(54) DRAWING OPERATIONS USING MULTIPLE GRAPHICS INTERFACES

(75) Inventors: Benjamin C. Constable, Redmond, WA (US); Blake D. Pelton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 111 days.

(21) Appl. No.: 13/093,782

(22) Filed: Apr. 25, 2011

(65) Prior Publication Data

US 2012/0268473 A1   Oct. 25, 2012

(51) Int. Cl.
  G09G 5/00   (2006.01)
  G06F 15/167  (2006.01)
  G06F 9/44   (2006.01)
  G06F 9/52   (2006.01)

(52) U.S. Cl.
  CPC .............. G09G 5/00 (2013.01); G06F 9/4443 (2013.01); G06F 9/52 (2013.01)
  USPC .......................................... 345/581; 345/541

(58) Field of Classification Search
  CPC ..... G06T 15/005; G06T 1/20; G06T 2210/52; G06F 9/52
  See application file for complete search history.

(56) References Cited

U.S. PATENT DOCUMENTS

| | | | |
|---|---|---|---|
| 5,046,023 A * | 9/1991 | Katsura et al. ................ | 345/619 |
| 6,525,739 B1 * | 2/2003 | Gurumoorthy et al. ...... | 345/566 |
| 7,386,697 B1 * | 6/2008 | Case et al. .................... | 711/171 |
| 7,528,838 B2 * | 5/2009 | Gosalia et al. ................ | 345/538 |
| 7,750,915 B1 * | 7/2010 | Acocella et al. .............. | 345/541 |
| 8,402,229 B1 * | 3/2013 | Wilt et al. ..................... | 711/152 |
| 2008/0100629 A1 | 5/2008 | Bakalash et al. | |
| 2008/0303835 A1 * | 12/2008 | Swift et al. .................... | 345/522 |
| 2009/0313622 A1 | 12/2009 | McMullen et al. | |
| 2010/0164983 A1 | 7/2010 | Lawrence et al. | |

OTHER PUBLICATIONS

Garland et al. "Parallel Computing Experiences with CUDA", 2008, MICRO, IEEE, v28, n4, pp. 13-27, 2008.*
Trentacoste, Matthew M., "Implementing Performance Libraries on Graphics Hardware", Retrieved at << http://matttrent.s3.amazonaws.com/heroku/attachments/research/papers/UgradThesis.pdf >>, 2003, pp. 1-31.
"About Direct2D", Retrieved at << http://msdn.microsoft.com/en-us/library/dd370987(v=vs.85).aspx >>, Retrieved Date: Feb. 17, 2011, pp. 4.
"Surface Sharing Between Windows Graphics APIs", Retrieved at << http://msdn.microsoft.com/en-us/library/ee913554(v=vs.85).aspx >>, Retrieved Date: Feb. 17, 2011, pp. 22.

* cited by examiner

*Primary Examiner* — Kee M Tung
*Assistant Examiner* — Nicholas R Wilson
(74) *Attorney, Agent, or Firm* — John Jardine; Kate Drakos; Micky Minhas

(57) ABSTRACT

Various embodiments provide techniques for enabling multiple graphics interfaces to be accessed to perform graphics-related operations. In at least some embodiments, techniques determine if the multiple graphics interfaces can share a memory resource for performing graphics operations. If the multiple graphics interfaces can share the memory resource, a coalescing graphics element is provided that can be used by applications to perform multiple graphics operations.

20 Claims, 7 Drawing Sheets

DRAWING OPERATIONS USING MULTIPLE GRAPHICS INTERFACES

BACKGROUND

Many computing devices include graphics interfaces that enable applications to perform drawing operations, such as for displaying and/or printing content. Graphics interfaces can include a layout engine, a rendering component, a graphics library, or other graphics utility (e.g., a graphics-based application-programming interface (API)) that provides access to a computing device's graphics functionalities.

To enable an application to perform a drawing operation on a computing device, a graphics interface can receive drawing operation attributes (e.g., content and formatting information) from the application and convert the drawing operation attributes into a form that can be used by the computing device's graphics functionalities. The graphics interface can then provide the converted drawing operation attributes to the graphics functionalities of the computing device, e.g., a video card, an embedded graphics processing unit (GPU), a printer, a printer driver, and so on. The graphics functionalities can then use the converted drawing operation attributes to output graphics, such as on a display screen of the computing device.

Sometimes a computing device that is associated with a particular graphics interface can be reconfigured to include a different graphics interface, such as an updated graphics interface. While an updated graphics interface may provide acceptable performance in most situations, sometimes an application or other utility will request access to a previous graphics interface as part of a request to perform a drawing operation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for enabling multiple graphics interfaces to be accessed to perform graphics operations. In at least some embodiments, techniques determine if multiple of the graphics interfaces can share a memory resource to perform a graphic operation, such as a drawing operation. If the multiple graphics interfaces can share the memory resource, a coalescing graphics element is provided that can be used by applications to perform multiple graphics operations. According to one or more embodiments, a coalescing graphics element is an object or other data structure that an application can use to set attributes for a graphics operation to enable the graphics operation to be performed by graphics functionalities of a computing device. If the multiple graphics interfaces cannot share the memory resource, a copy of one or more portions of a display area is provided to the application to be used to set the attributes for the graphics operation. Thus, in at least some embodiments, techniques are provided for enabling cooperation between multiple graphics interfaces associated with a computing device to perform drawing operations.

BRIEF DESCRIPTION OF THE DRAWINGS

The same numbers are used throughout the drawings to reference like features.

DETAILED DESCRIPTION

Overview

Various embodiments provide techniques for enabling multiple graphics interfaces to be accessed to perform graphics-related operations. In at least some embodiments, techniques determine if multiple of the graphics interfaces can share a memory resource for to perform a graphics operation, such as a drawing operation. If the multiple graphics interfaces can share the memory resource, a coalescing graphics element is provided that can be used by applications to perform multiple graphics operations. According to one or more embodiments, a coalescing graphics element is an object or other data structure that an application can use to set attributes for a graphics operation to enable the graphics operation to be performed by graphics functionalities of a computing device. If the multiple graphics interfaces cannot share the memory resource, a copy of one or more portions of a display area is provided to the application to be used to set the attributes for the graphics operation. Thus, in at least some embodiments, techniques are provided for enabling cooperation between multiple graphics interfaces associated with a computing device to perform drawing operations.

For example, consider a scenario where a computing device that is associated with a first graphics interface is reconfigured (e.g., updated) to include a second graphics interface. In at least some embodiments, the second graphics interface can be an updated graphics interface that is configured to provide more advanced graphics capabilities than the first graphics interface. While the second graphics interface can provide acceptable performance in most situations, some applications may request access to the first graphics interface to perform drawing operations. Thus, techniques are discussed herein that can enable multiple graphics interfaces (e.g., the first and second graphics interfaces discussed previously) to coexist and cooperate on a single computing device and/or system to perform drawing operations.

In the discussion that follows, a section entitled "Operating Environment" is provided and describes one environment in which one or more embodiments can be employed. Following this, a section entitled "Example Methods" describes example methods in accordance with one or more embodiments. Next, a section entitled "Example Drawing Areas" describes example drawing areas in accordance with one or more embodiment. Last, a section entitled "Example System" describes an example system that can be utilized to implement one or more embodiments.

Operating Environment

Figure 1:
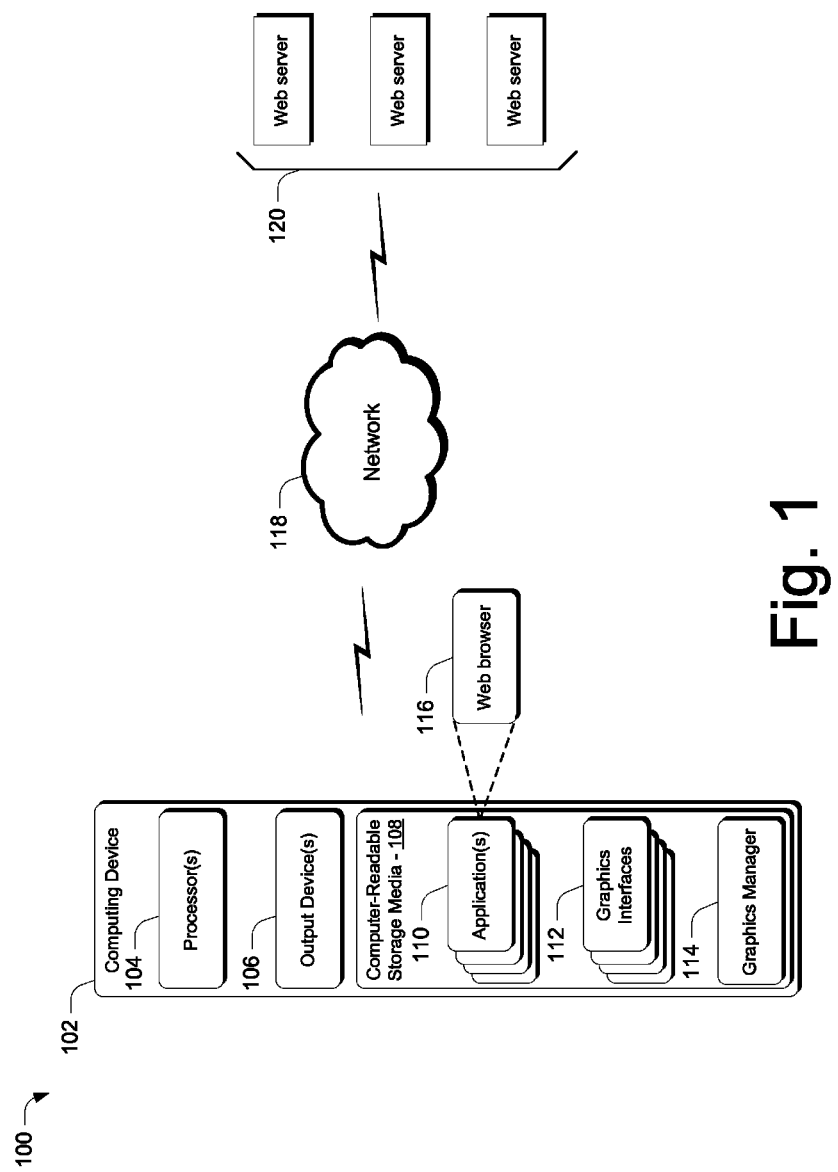
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more output devices 106, and one or more computer-readable storage media 108. Computing device 102 can be embodied as any suitable computing device such as, by way of example and not limitation, a desktop computer, a portable computer, a handheld computer such as a personal digital assistant (PDA), cell phone, and the like. Additionally, the output devices 106 can include any suitable device that can output content, such as a monitor, a display screen, a printer, an audio speaker, and so on.

Also included as part of the computing device 102 are one or more applications 110, one or more graphics interfaces 112, and a graphics manager 114 that reside on the computer-readable storage media 108 and which are executable by the processor(s) 104. Illustrated as one example of the application(s) 110 is a web browser 116. While the graphics interface(s) 112 and the graphics manager 114 are illustrated as separate entities, this is not intended to be limiting. For example, in some embodiments, the graphics interface(s) 112 and/or the graphics manager 114 can be included as part of an application, such as the web browser 116, or as part of an operating system of the computing device 102. The computer-readable storage media 108 can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 7.

In addition, environment 100 includes a network 118, such as the Internet, and one or more web servers 120 which are remote from the computing device 102 and from which content can be received (e.g., downloaded) and to which content can be sent, as described above and below. Such content can include web pages, files, images, and so on.

As an example implementation of techniques discussed herein, consider a scenario where a user navigates the web browser 116 to a web page hosted by one of the web servers 120. To display content associated with the web page, graphics information is received at the computing device 102 from the one of the web servers 120 that is hosting the web page. Examples of the graphics information can include content data (e.g., hypertext markup language (HTML), extensible markup language (XML), images files, and so on) and formatting information, e.g., cascading style sheet (CSS) data, extensible style sheet (XSL) data, and so on. The graphics manager 114 can inspect the graphics information and determine which of the graphics interfaces 112 is to be used to render the content associated with the graphics information. In at least some embodiments, the graphics manager 114 can determine that multiple graphics interfaces 112 are to be used to render the content.

Further to this example implementation, the graphics manager 114 routes the graphics information to the appropriate graphics interface(s) 112, which then converts the graphics information into a form that can be output by the output device(s) 106. In at least some embodiments, the computing device 102 can include drivers (e.g., as part of the application(s) 110) that are associated with the output device(s) 106 and that enable the graphics information to be output via the output device(s).

Having described an example operating environment, consider now a discussion of some example methods in accordance with one or more embodiments.

Example Methods

Figure 2:
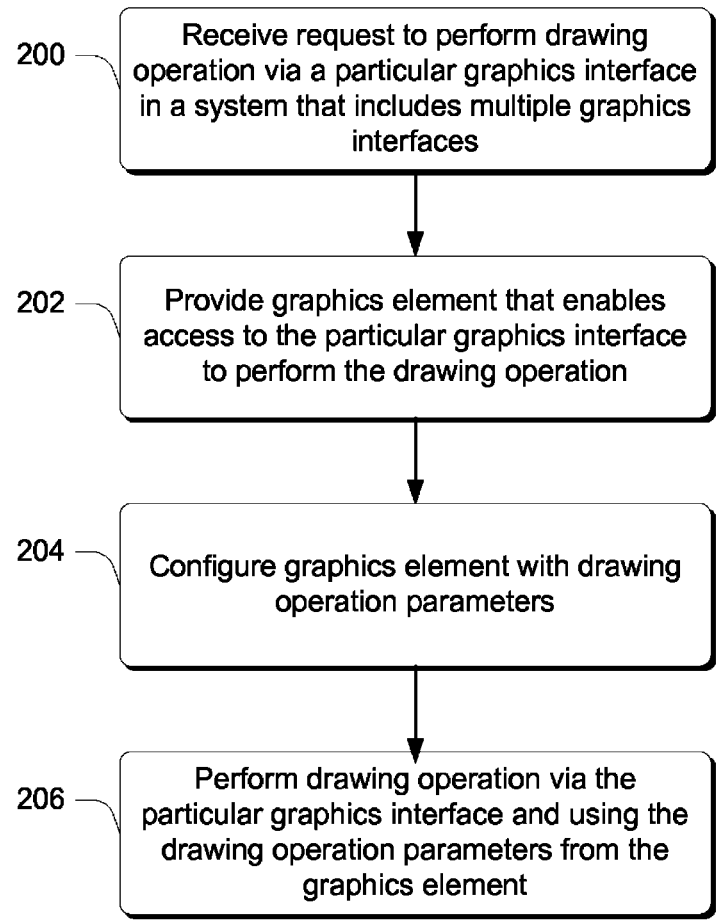
FIG. 2 is a flow diagram that describes steps in a method in accordance with one or more embodiments.

FIG. 2 is a flow diagram that describes steps a method in accordance with one or more embodiments. The method can be implemented in connection with any suitable hardware, software, firmware, or combination thereof. In at least some embodiments, the method can be implemented in software in the form of a graphics manager and/or graphics interfaces, such as the ones described above.

Step 200 receives a request to perform a drawing operation via a particular graphics interface in a system that includes multiple graphics interfaces. For example, with reference to operating environment 100 discussed above, the web browser 116 can receive graphics information associated with a web page from one of the web servers 120. The graphics manager 114 can determine that a particular one of the graphics interfaces 112 is to be used to perform a drawing operation to enable the graphics information to be visually rendered. In at least some embodiments, this determination can be made based on rendering instructions provided by the web browser 116 and/or as part of graphics information received from the web servers 120.

Step 202 provides a graphics element that enables access to the particular graphics interface to perform the drawing operation. Example ways of providing a graphics element and/or enabling access to a particular graphics interface are discussed in detail below. In at least some embodiments, a graphics element refers to an object or other data structure associated with a graphics interface. Attributes associated with a drawing operation can be set on a graphics element and the graphics element can be forwarded to a graphics interface to enable the drawing operation to be performed. Examples of attributes associated with a drawing operation include color, line width, brush pattern, a font typeface, a clipping region, a pixel region, and so on.

Step 204 configures the graphics element with drawing operation attributes. In at least some embodiments, an application that requested the graphics element can receive or otherwise operate upon the graphics element (e.g., via step 202) and set drawing operation attributes on the graphics element.

Step 206 performs the drawing operation via the particular graphics interface and using the drawing operation attributes from the graphics element. In at least some embodiments, the graphics element can be returned from an application that requested the graphics element to the particular graphics interface. The particular graphics interface can then ascertain the drawing operation attributes from the graphics element, convert the drawing operation attributes into a form that can be interpreted by an output device, and forward the converted drawing operation attributes to an output device. Further to some embodiments, performing the drawing operation can cause content (e.g., images, text, and so on) to be output, such as via the output device(s) 106.

Figure 3:
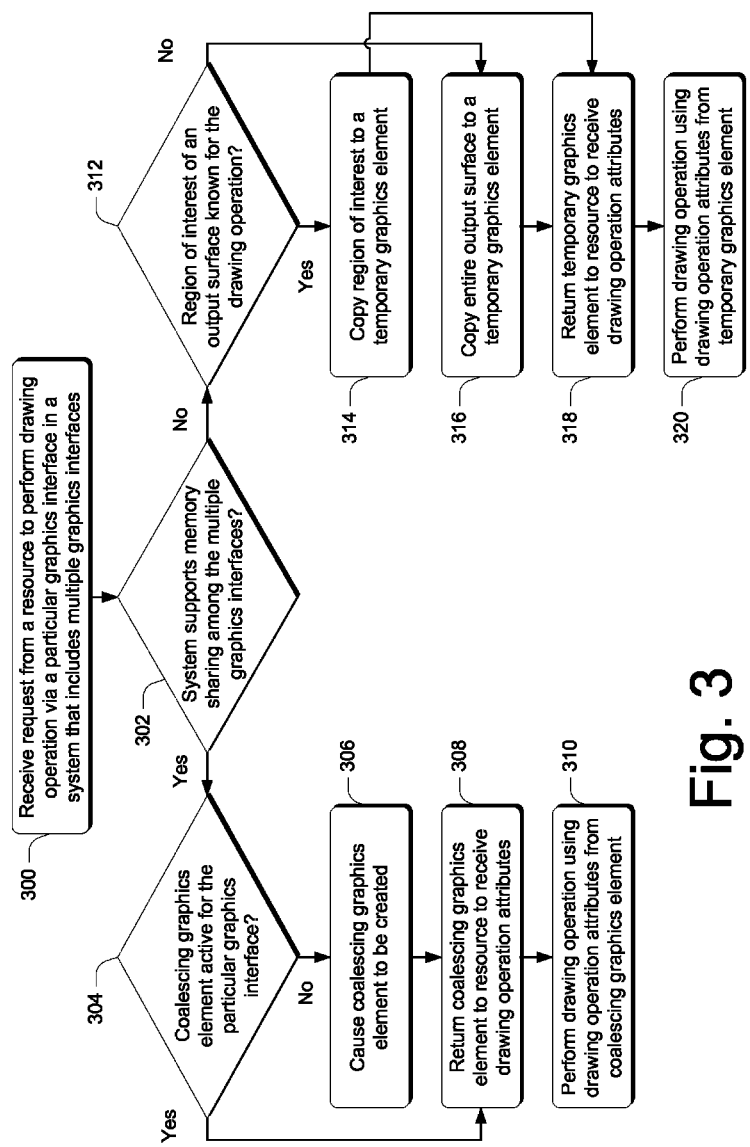
FIG. 3 is a flow diagram that describes steps in a method in accordance with one or more embodiments.

FIG. 3 is a flow diagram that describes steps a method in accordance with one or more embodiments. The method can be implemented in connection with any suitable hardware, software, firmware, or combination thereof. In at least some embodiments, the method can be implemented in software in the form of a graphics manager and/or graphics interfaces, such as the ones described above.

Step 300 receives a request from a resource to perform a drawing operation via a particular graphics interface in a system that includes multiple graphics interfaces. For example, with reference to operating environment 100 discussed above, the web browser 116 can receive web page content from one of the web servers 120 and can send a request to the graphics manager 114 to perform a drawing operation to enable the web page content to be displayed.

Step 302 determines whether the system supports memory sharing among the multiple graphics interfaces. In at least some embodiments, memory sharing refers to the ability for multiple graphics interfaces to access and/or operate on the same portion of memory, e.g., to simultaneously and/or concurrently access a same area of random access memory (RAM). In at least some embodiments and with reference to graphics-related operations such as a drawing operation, memory sharing can refer to the ability for multiple graphics interfaces to access the same pixel buffer in memory and to perform drawing operations using the pixel buffer.

If the system supports memory sharing among the multiple graphics interfaces ("Yes"), step 304 determines whether a coalescing graphics element is active for the particular graphics interface. In at least some embodiments, a coalescing graphics element refers to a graphics element that can be reused for multiple drawing operations. For example, in some implementations, after a graphics interface is finished performing a drawing operation (e.g., as discussed above with reference to FIG. 2), an application that requested the graphics element can release the graphics element so that other graphics elements can be created (e.g., by a graphics interface) to perform other drawing operations. By using a coalescing graphics element enabled by a memory sharing scenario, however, the coalescing graphics element can be kept active after being used to perform a drawing operation to enable other drawing operations to be performed. This can save time and/or computing resources that would be used to create another graphics element for performing other drawing operations. In at least some embodiments, a determination as to whether a coalescing graphics element is active for the particular graphics interface can be made by querying the particular graphics interface (e.g., by the graphics manager 114) to determine if the coalescing graphics element is active.

Returning to step 304, if a coalescing graphics element is not active for the particular graphics interface ("No"), step 306 causes a coalescing graphics element to be created for the drawing operation. In at least some embodiments, the coalescing graphics element can be created via a call to the particular graphics interface requesting that a coalescing graphics element be created.

If a coalescing graphics element is active ("Yes"), step 308 returns the coalescing graphics element to the resource to receive drawing operation attributes. Examples of drawing operation attributes are discussed above. Step 310 performs the drawing operation using the drawing operation attributes from the coalescing graphics element. In at least some embodiments, the particular graphics interface can cause the drawing operation to be performed by ascertaining the drawing operation attributes from the coalescing graphics element and converting the drawing operation attributes into a form that can be output by an output device, e.g., the output device(s) 106. While not expressly illustrated here, results of the drawing operation can be output by an output device, e.g., displayed by a display screen and/or printed by a printer.

Returning to step 302, if the system does not support memory sharing among the multiple graphics interfaces ("No"), step 312 determines if a region of interest of an output surface is known for the drawing operation. In at least some embodiments, a region of interest refers to a sub-region of a larger output surface, such as a page to be printed by a printer and/or a page to be displayed via a display device. Example ways of defining and/or determining a region of interest are discussed below.

If a region of interest is known ("Yes"), step 314 copies the region of interest to a temporary graphics element. In at least some embodiments, a temporary graphics element refers to a graphics element that is created (e.g., by the particular graphics interface) for a single drawing operation and that is released after the single drawing operation. Further to some embodiments, pixel values (e.g., color values, shading values, pixels coordinates, and so on) for the region of interest can be copied to the temporary graphics element.

If a region of interest is not known ("No"), step 316 copies the entire output surface to a temporary graphics element. For example, pixels values for an entire display area can be copied to the temporary graphics element. Step 318 returns the temporary graphics element to the resource to receive drawing operation attributes. Depending on whether a region of interest is known or not (as discussed above), the temporary graphics element can include a copy of the region of interest and/or a copy of an entire output surface. In at least some embodiments, the resource can set attributes for the drawing operation on the temporary graphics element. For example, the resource can manipulate the copy of the region of interest and/or the entire output surface included as part of the temporary graphics element, such as by changing formatting and/or pixel values associated with the copy of the region of interest and/or the entire output surface. The resource can then return the temporary graphics element to the particular graphics interface.

Step 320 performs the drawing operation using the drawing operation attributes from the temporary graphics element. In at least some embodiments, the particular graphics interface can ascertain the drawing operation attributes from the temporary graphics element (e.g., pixel values associated with a copy of the region of interest and/or the entire output surface) and convert the attributes into a form that can be output by an output device. While not expressly illustrated here, results of the drawing operation can be output by an output device, e.g., displayed by a display screen and/or printed by a printer.

Figure 4:
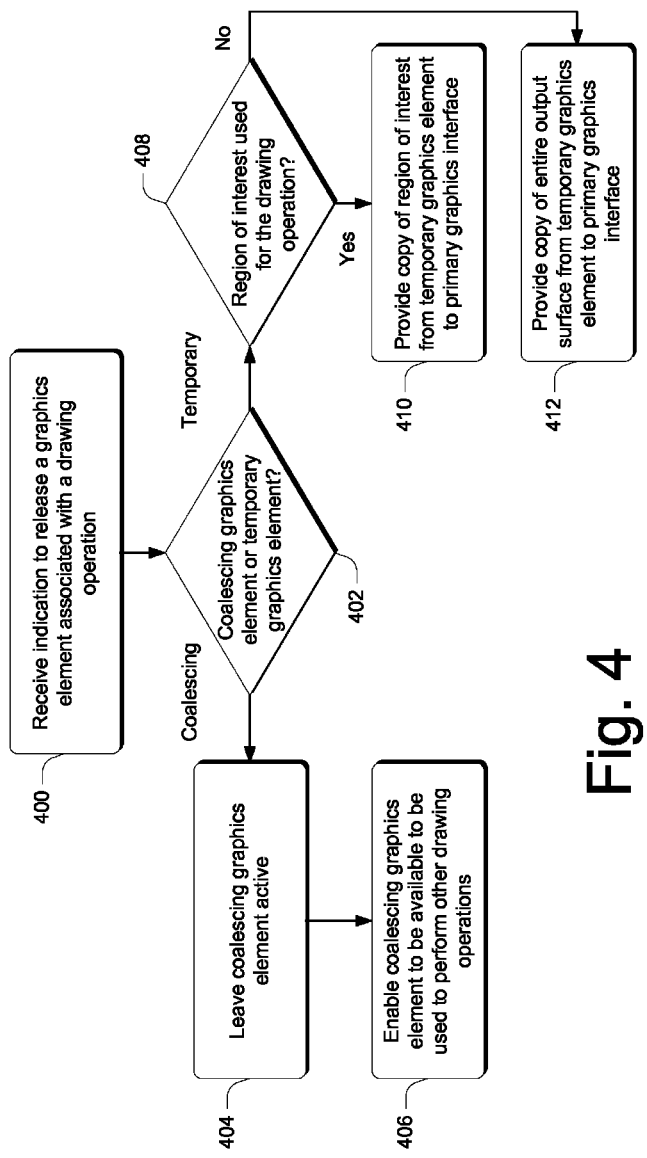
FIG. 4 is a flow diagram that describes steps in a method in accordance with one or more embodiments.

FIG. 4 is a flow diagram that describes steps a method in accordance with one or more embodiments. The method can be implemented in connection with any suitable hardware, software, firmware, or combination thereof. In at least some embodiments, the method can be implemented in software in the form of a graphics manager and/or graphics interfaces, such as the ones described above. Further to some embodiments, the method can be implemented subsequent to a drawing operation that utilizes a graphics element, such as the example drawing operations discussed above with reference to FIG. 3.

Step 400 receives an indication to release a graphics element associated with a drawing operation. For example, after a drawing operation is performed, an application that requested the graphics element as part of the drawing operation can release a handle to the graphics element. Step 402 determines if the graphics element is a coalescing graphics element or a temporary graphics element. Example embodiments of a coalescing graphics element and a temporary graphics element are discussed above and below.

If the graphics element is a coalescing graphics element ("Coalescing"), step 404 leaves the coalescing graphics element active. Step 406 enables the coalescing graphics element to be available to be used to perform other drawing operations. For example, an application can call a graphics interface and request the coalescing graphics element. The coalescing graphics element can then be used by the application to perform a drawing operation, e.g., as discussed above with reference to FIG. 3.

Returning to step 402, if the graphics element is a temporary graphics element ("Temporary"), step 408 determines if a region of interest was used for the drawing operation. Example discussions of a region of interest are provided above and below. If a region of interest was used ("Yes"), step 410 provides a copy of the region of interest from the temporary graphics element to a primary graphics interface. For example, in at least some embodiments, the temporary graphics element can be associated with an ancillary graphics interface, such as a previous version of a graphics interface that is operable on a computing device but is not responsible for the primary graphics functionality of the computing device.

Further to such embodiments, the computing device can include a primary graphics interface that handles the primary graphics functionality of the computing device but that retains some compatibility (e.g., via extension points) with other graphics interfaces, e.g., the ancillary graphics interface. This can allow applications and/or content to request that drawing operations be performed via a graphics interface other than the primary graphics interface (e.g., the ancillary graphics interface) while enabling a computing device to maintain compatibility with multiple graphics interfaces. Thus, a copy of a region of interest can be drawn on by one graphics interface (e.g., an ancillary graphics interface) and then provided to a different graphics interface (e.g., a primary graphics interface) to be displayed as part of a display area managed by the different graphics interface.

Returning to step 408, if a region of interest was not used for the drawing operation ("No"), step 412 provides a copy of an entire output surface from the temporary graphics element to a primary graphics interface. In at least some embodiments and with reference to the discussion above, the temporary graphics element can be associated with one graphics interface (e.g., an ancillary graphics interface), and the copy of the entire output surface can be drawn on by the one graphics interface and provided to a different graphics interface (e.g., a primary graphics interface) to be displayed.

Figure 5:
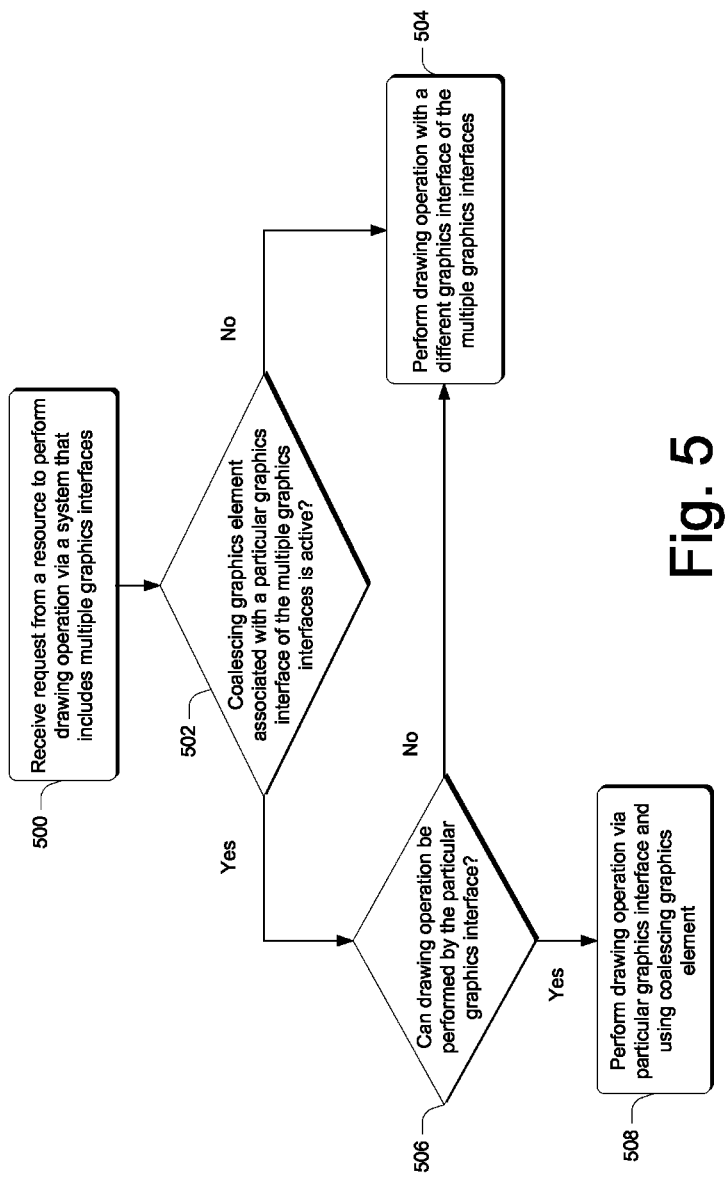
FIG. 5 is a flow diagram that describes steps in a method in accordance with one or more embodiments.

FIG. 5 is a flow diagram that describes steps a method in accordance with one or more embodiments. The method can be implemented in connection with any suitable hardware, software, firmware, or combination thereof. In at least some embodiments, the method can be implemented in software in the form of a graphics manager and/or graphics interfaces, such as the ones described above.

Step 500 receives a request from a resource to perform a drawing operation via a system that includes multiple graphics interfaces. For example, with reference to operating environment 100 discussed above, the graphics manager 114 and/or the graphics interface(s) 112 can receive a request from the web browser 116 to perform a drawing operation. Step 502 determines if a coalescing graphics element associated with a particular graphics interface of the multiple graphics interfaces is active. If a coalescing graphics element is not active ("No"), step 504 performs the drawing operation using a different graphics interface of the multiple graphics interfaces. In at least some embodiments, the particular graphics interface can be an ancillary graphics interface and the different graphics interface can be a primary graphics interface.

Returning to step 502, if a coalescing graphics element is active ("Yes"), step 506 determines if the drawing operation can be performed by the particular graphics interface. In at least some embodiments, the determination as to whether a drawing operation can be performed by a particular graphics interface can be made based on the nature and/or complexity of the drawing operation. For example, the particular graphics interface may be capable of performing simple drawing operations (e.g., solid color fills, simple line drawings, and so on) but may not be suitable for performing more complex drawing operations, such as animation, 3-dimensional image simulations, and so on. If the drawing operation cannot be performed by the particular graphics interface ("No"), step 504 performs the drawing operation using a different graphics interface. In at least some embodiments, if it is determined at step 506 that the drawing operation cannot be performed by the particular graphics interface, the coalescing graphics element can be released (e.g., deactivated) such that the coalescing graphics element is no longer active.

If the drawing operation can be performed by the particular graphics interface ("Yes"), step 508 performs the drawing operation using the particular graphics interface and using the coalescing graphics element. Example techniques for performing a drawing operation are discussed above in accordance with one or more embodiments.

Having described some example methods, consider now a discussion of some example drawing areas in accordance with one or more embodiments.

Example Drawing Areas

Figure 6:
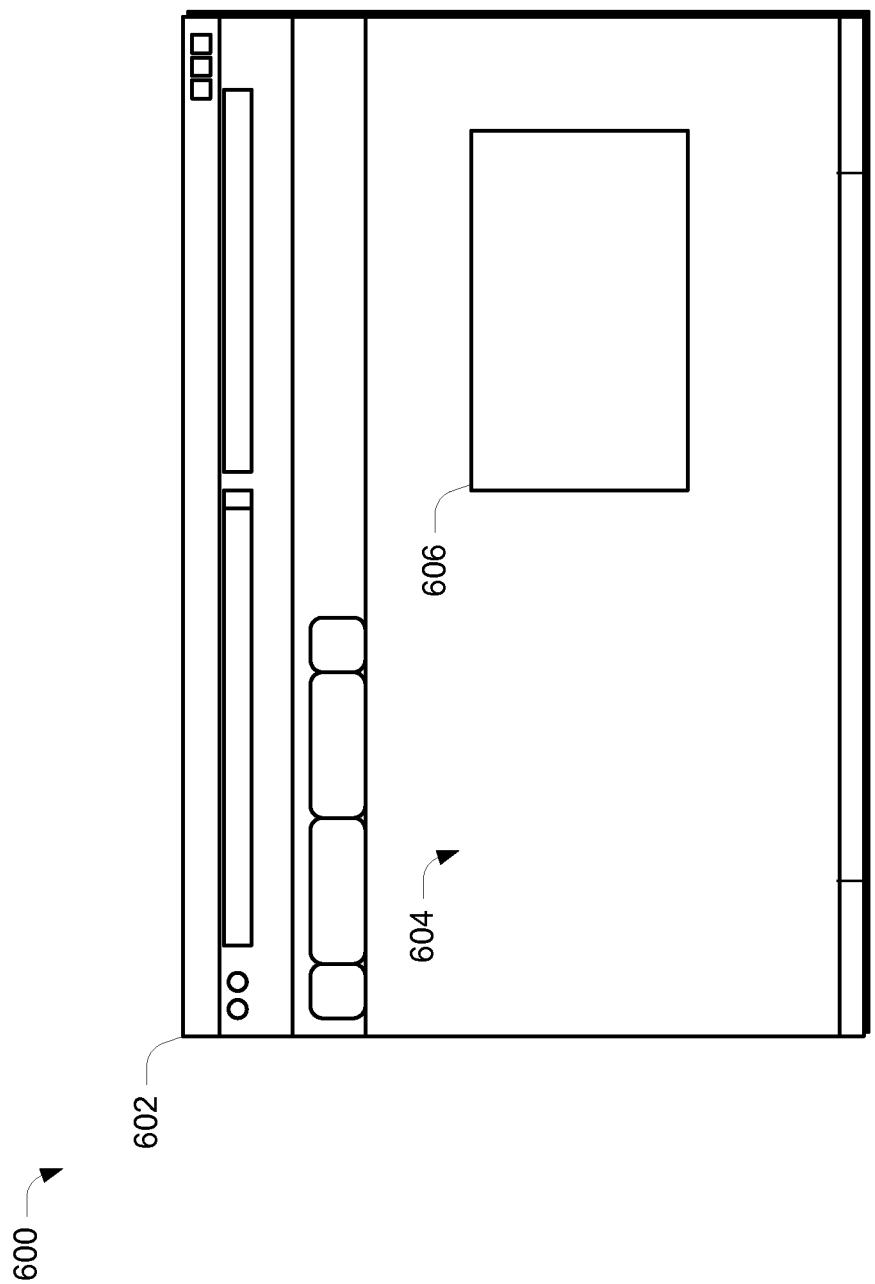
FIG. 6 illustrates example drawing areas that can be drawn on utilizing techniques discussed herein in accordance with one or more embodiments.

FIG. 6 illustrates some example drawing areas in accordance with one or more embodiments, generally at 600. In at least some embodiments, techniques discussed herein can be implemented to perform drawing operations within the example drawing areas.

Included as part of the drawing areas 600 are a user interface 602, an output surface 604, and a region of interest 606. In at least some embodiments, the user interface 602 can be associated with the application(s) 110, such as the web browser 116, and can be output via the output devices 106. Further to some embodiments, the output surface 604 is a primary display area for the user interface 602 and can display content, such as content received from the web servers 120.

According to one or more embodiments, the region of interest 606 can refer to a window or other sub-region within the output surface 604. Further, the region of interest can be defined according to a particular area of pixels, e.g., as defined using pixels coordinates in a particular display area. In at least some embodiments, the region of interest can be defined within content data (e.g., as part of CSS and/or XSL data) such that the region of interest can be identified for use in techniques discussed herein.

In at least some embodiments, and as discussed above, in scenarios where memory is not shared among multiple graphics interfaces, the output surface 604 and/or the region of interest 606 can be copied and used to perform drawing operations. See, for example, FIGS. 3 and 4 and their discussion above.

Having described some example drawing areas, consider now a discussion of an example system in accordance with one or more embodiments.

Example System

Figure 7:
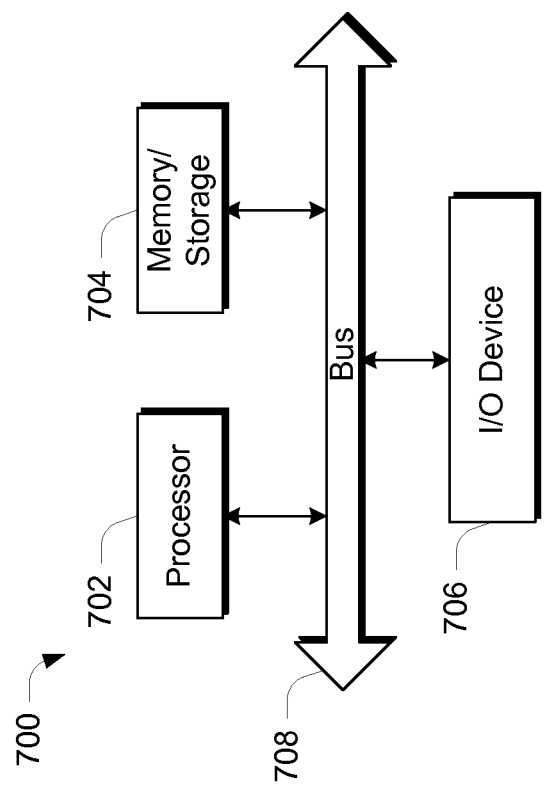
FIG. 7 illustrates an example system that can be used to implement one or more embodiments.

FIG. 7 illustrates an example computing device 1600 that can be used to implement the various embodiments described above. Computing device 700 can be, for example, computing device 102 or web server(s) 120 of FIG. 1.

Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Component 704 can include volatile media (such as random access memory (RAM)) and/or non-volatile media (such as read only memory (ROM), Flash memory, optical disks, magnetic disks, and so forth). Component 704 can include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. While the computing device 700 is configured to receive and/or transmit instructions via a signal bearing medium (e.g., as a carrier wave) to implement techniques discussed herein, computer-readable storage media of the computing device are configured to store information and thus do not include a signal bearing medium.

CONCLUSION

Various embodiments provide techniques for enabling multiple graphics interfaces to be accessed to perform graphics-related operations. In at least some embodiments, techniques determine if the multiple graphics interfaces can share a memory resource for performing graphics operations. If the multiple graphics interfaces can share the memory resource, a coalescing graphics element is provided that can be used by applications to perform multiple graphics operations.

According to one or more embodiments, a coalescing graphics element is an object or other data structure that an application can use to set attributes for a graphics operation to enable the graphics operation to be performed by graphics functionalities of a computing device. If the multiple graphics interfaces cannot share the memory resource, a copy of one or more portions of a display area is provided to the application to be used to set the attributes for the graphics operation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A computer-implemented method comprising:
receiving a request from a resource to perform a drawing operation in a system that includes multiple graphics interfaces, the multiple graphics interfaces including a first graphics interface that is an updated version of a second graphics interface and which is configured to provide more advanced graphics capabilities in comparison to the second graphics interface, the first graphics interface being responsible for primary graphics functionality of the system;
determining whether the system supports memory sharing among the multiple graphics interfaces by determining whether the system supports the ability of the multiple graphics interfaces to access a same portion of memory one or more of simultaneously or concurrently;
in an event that the system supports memory sharing among the multiple graphics interfaces:
determining whether a coalescing graphics element is active for the second graphics interface; and
responsive to a determination that the coalescing graphics element is active, using the coalescing graphics element to receive drawing operation attributes from the resource, and performing the drawing operation based on the drawing operation attributes via the second graphics interface in place of the first graphics interface; and
in an event that the system does not support memory sharing among the multiple graphics interfaces, copying at least a portion of an output surface to a temporary graphics element, receiving drawing operation attributes from the resource via manipulation of the copy of the at least a portion of the output surface in the temporary graphics element, and performing the drawing operation on the output surface and based on the drawing operation attributes.

2. The computer-implemented method of claim 1, wherein the resource comprises one or more of an application that resides on the system or a resource that is remote from the system.

3. The computer-implemented method of claim 1, wherein the same portion of memory comprises a same area of random access memory (RAM).

4. The computer-implemented method of claim 1, wherein the drawing operation attributes comprise one or more of a color, a line width, a brush pattern, or a pixel region associated with the drawing operation.

5. The computer-implemented method of claim 1, wherein the coalescing graphics element comprises an object that is configured to remain active after the drawing operation is completed and is further configured to be used to perform one or more other drawing operations.

6. The computer-implemented method of claim 1, wherein the output surface comprises one or more of a region of a page to be printed or a region of a page to be displayed.

7. The computer-implemented method of claim 1, wherein the at least a portion of the output surface comprises a region of interest of the output surface and the region of interest comprises a pixel sub-region of the output surface.

8. The computer-implemented method of claim 1, wherein the method further comprises, in the event that the system supports memory sharing among the multiple graphics interfaces, leaving the coalescing graphics element active to be used to perform one or more other drawing operations.

9. A system comprising:
one or more processors; and
a memory storing executable instructions that are executable by the one or more processors to perform operations including:
receiving a request from a resource to perform a drawing operation in a system that includes multiple graphics interfaces, the multiple graphics interfaces including a particular graphics interface and an updated version of the particular graphics interface, the updated version of the particular graphics interface being responsible for primary graphics functionalities of the system;
determining whether a coalescing graphics element associated with the particular graphics interface of the multiple graphics interfaces is active, the coalescing graphics element comprising a data structure that is usable by the resource to set drawing operation attributes to enable the drawing operation to be performed; and
responsive to a determination that the coalescing graphics element is active, causing the drawing operation to be performed via the particular graphics interface, rather than via the updated version of the particular graphics interface, and using the drawing operation attributes set by the resource on the coalescing graphics element.

10. The system of claim 9, wherein the request from a resource to perform a drawing operation comprises a request to perform the drawing operation via the particular graphics interface.

11. The system of claim 9, wherein determining whether a coalescing graphics element associated with a particular graphics interface is active comprises querying the particular graphics interface to determine if the coalescing graphics element is active.

12. The system of claim 9, wherein determining whether a coalescing graphics element associated with a particular graphics interface is active is responsive to a determination that the system supports memory sharing among the multiple graphics interfaces.

13. The system of claim 9, wherein the drawing operation attributes comprise one or more of a color, a line width, a brush pattern, or a pixel region associated with the drawing operation.

14. The system of claim 9, wherein the operations further comprise leaving the coalescing graphics element active to be used to perform one or more other drawing operations.

15. One or more computer readable storage media storing computer-executable instructions that are executable to perform operations comprising:
receiving a request to perform a drawing operation in a system that includes a plurality of graphics interfaces including a first graphics interface and a second graphics interface, the second graphics interface being responsible for primary graphics functionality and configured to provide more advanced graphics capabilities in comparison to the first graphics interface, the first graphics interface being configured to perform a drawing operation using a coalescing graphics element associated with the first graphics interface;
responsive to receiving the request, determining whether the coalescing graphics element is active including determining whether the system that includes the plurality of graphics interfaces supports the ability of the plurality of graphics interfaces to access a same portion of memory;
responsive to a determination that the coalescing graphics element is active, causing the coalescing graphics element to be provided to a resource that generated the request to perform the drawing operation, the coalescing graphics element being configured to receive one or more drawing operation attributes from the resource to be used by the first graphics interface in place of the second graphics interface for performing the drawing operation.

16. The one or more computer readable storage media of claim 15, wherein the coalescing graphics element comprises an object created by the first graphics interface.

17. The one or more computer readable storage media of claim 15, wherein the graphics manager is further configured to cause the coalescing graphics element to remain active after the drawing operation is performed and enable the coalescing graphics element to be available to be used to perform one or more other drawing operations.

18. The one or more computer readable storage media of claim 15, wherein the graphics manager is further configured to, responsive to a determination that the coalescing graphics element is not active, cause an active coalescing graphics element to be obtained and provided to the resource for receiving the one or more drawing operation attributes.

19. The one or more computer readable storage media of claim 15, wherein the graphics manager is further configured to:
responsive to a determination that the plurality of graphics interfaces are not able to share the same pixel buffer, cause a temporary graphics element to be created, the temporary graphics element being configured to receive a copy of at least a portion of an output surface associated with the drawing operation; and
cause the temporary graphics element to be provided to the resource to receive the drawing operation attributes via manipulation of the copy of the at least a portion of the output surface.

20. The one or more computer readable storage media of claim 15, wherein:
the first graphics interface represents an ancillary graphics interface that is a previous version of the second graphics interface and which is not responsible for primary graphics functionalities; and
the request includes a request to perform the drawing operation using the ancillary graphics interface.

* * * * *